United States Patent
Smith et al.

(10) Patent No.: US 11,238,180 B2
(45) Date of Patent: Feb. 1, 2022

(54) RESTRICTED MULTIPLE-APPLICATION USER EXPERIENCE VIA SINGLE-APPLICATION MODE

(71) Applicant: Bank of America Corporation, Charlotte, NC (US)

(72) Inventors: Brian Joseph Smith, Saint Augustine, FL (US); Derrick A. Parks, Jacksonville, FL (US); James R. Alexander, Dripping Springs, TX (US)

(73) Assignee: Bank of America Corporation, Charlotte, NC (US)

( * ) Notice: Subject to any disclaimer, the term of this patent is extended or adjusted under 35 U.S.C. 154(b) by 99 days.

(21) Appl. No.: 16/885,359

(22) Filed: May 28, 2020

(65) Prior Publication Data
US 2020/0293674 A1 Sep. 17, 2020

Related U.S. Application Data

(63) Continuation of application No. 15/939,664, filed on Mar. 29, 2018, now Pat. No. 10,678,948.

(51) Int. Cl.
*G06F 21/00* (2013.01)
*G06F 21/62* (2013.01)

(52) U.S. Cl.
CPC .... *G06F 21/629* (2013.01); *G06F 2221/2149* (2013.01)

(58) Field of Classification Search
None
See application file for complete search history.

(56) References Cited

U.S. PATENT DOCUMENTS 6,292,473 B1 ‡ 9/2001 Duske, Jr. .......... H04B 7/18567
370/316
8,769,412 B2 * 7/2014 Gill ........................ G06F 21/55
715/736

(Continued)

OTHER PUBLICATIONS

Khan, Safayet et al. Design and fabrication of a password protected vehicle security and performance monitoring system. 2017 IEEE Region 10 Humanitarian Technology Conference (R10-HTC). https://ieeexplore.ieee.org/stamp/stamp.jsp?tp=&arnumber=8289022 (Year: 2017).*

(Continued)

*Primary Examiner* — Jeremiah L Avery
(74) *Attorney, Agent, or Firm* — Weiss & Arons LLP

(57) ABSTRACT

Apparatus and methods are provided for enabling a restricted multiple-application user experience via single-application (SA) modes. A plurality of SA applications on a computer device may be configured with SA modes. The SA mode of a running SA application may prevent all other applications from running. Multiple SA applications may be linked, enabling a user to navigate between the linked applications while being restricted by each SA application's SA mode. A link may involve a transfer event that deactivates the SA mode of a first SA application and exits the first SA application. A second SA application is then called, whereupon the SA mode of the second SA application is activated. One SA application may be configured as a dashboard application. The dashboard application may include a password dependent escape event. The escape event may deactivate the SA mode of the dashboard application and exit the restricted multiple-application experience.

20 Claims, 10 Drawing Sheets

(56) References Cited

U.S. PATENT DOCUMENTS

| | | | | |
|---|---|---|---|---|
| 10,021,138 | B2 ‡ | 7/2018 | Gill | G06F 21/577 |
| 2012/0096392 | A1* | 4/2012 | Ording | G06F 9/451 |
| | | | | 715/783 |
| 2012/0311525 | A1* | 12/2012 | Xoual | G06Q 10/06 |
| | | | | 717/104 |
| 2013/0145297 | A1 ‡ | 6/2013 | Ricci | B60R 21/01512 |
| | | | | 715/765 |
| 2014/0032759 | A1* | 1/2014 | Barton | H04W 12/06 |
| | | | | 709/225 |
| 2014/0310788 | A1 ‡ | 10/2014 | Ricci | G06F 16/583 |
| | | | | 726/6 |
| 2014/0337621 | A1 ‡ | 11/2014 | Nakhimov | G06F 1/163 |
| | | | | 713/168 |
| 2015/0365306 | A1 ‡ | 12/2015 | Chaudhri | G06F 3/0416 |
| | | | | 715/736 |
| 2016/0357305 | A1 ‡ | 12/2016 | Wells | G06F 3/0488 |
| 2017/0149795 | A1* | 5/2017 | Day, II | H04L 63/101 |
| 2017/0220307 | A1* | 8/2017 | Da Silva Ramos | |
| | | | | G06F 3/04817 |
| 2018/0329550 | A1* | 11/2018 | Dellinger | G06F 3/0486 |

OTHER PUBLICATIONS

Demissie, Biniam Fisseha et al. Identifying Android Inter-app Communication Vulnerabilities Using Static and Dynamic Analysis. 2016 IEEE/ACM International Conference on Mobile Software Engineering and Systems (MOBILESoft). https://ieeexplore.ieee.org/stamp/stamp.jsp?tp=&arnumber=7832991 (Year: 2016).*

Kendall, Richard P. et al. A Risk-Based, Practice-Centered Approach to Project Management for HPCMP CREATE. Computing in Science & Engineering, vol. 18, Issue: 1. https://ieeexplore.ieee.org/stamp/stamp.jsp?tp=&arnumber=7325185 (Year: 2016).*

Fasil, Mousie et al. Application-Aware Cross-Layer Framework: Video Content Distribution in Wireless Multihop Networks. 2015 IEEE 26th Annual Symposium on Personal, Indoor, and Mobile Radio Communications https://ieeexplore.ieee.org/stamp/stamp.jsp?tp=&arnumber=7343460 (Year: 2015).‡

Marmsoler, Diego. On the Semantics of Temporal Specifications of Component-Behavior for Dynamic Architectures. 2017 International Symposium on Theoretical Aspects of Software Engineering (TASE). https://ieeexplore.ieee.org/stamp/stamp.jsp?tp=&arnumber=8285638 (Year: 2017).‡

Fasil, Mousie et al. Application-Aware Cross-Layer Framework: Video Content Distribution in Wireless Multihop Networks. 2015 IEEE 26th Annual Symposium on Personal, Indoor, and Mobile Radio Communications https://ieeexplore.ieee.org/stamp/stamp.jsp?tp=&arnumber=7343460 (Year: 2015).

Marmsoler, Diego. On the Semantics of Temporal Specifications of Component-Behavior for Dynamic Architectures. 2017 International Symposium on Theoretical Aspects of Software Engineering (TASE). https://ieeexplore.ieee.org/stamp/stamp/jsp?tp=&arnumber=8285638 (Year: 2017).

\* cited by examiner
‡ imported from a related application

RESTRICTED MULTIPLE-APPLICATION USER EXPERIENCE VIA SINGLE-APPLICATION MODE

CROSS REFERENCE TO RELATED APPLICATION

This application is a continuation of U.S. patent application No. 15/939,664 filed on Mar. 29, 2018 and entitled "RESTRICTED MULTIPLE-APPLICATION USER EXPERIENCE VIA SINGLE-APPLICATION MODE" which is hereby incorporated by reference herein in its entirety.

FIELD OF TECHNOLOGY

This application relates to computer applications. Specifically, this application relates to enabling a restricted multiple-application user experience via single-application mode(s).

BACKGROUND OF THE DISCLOSURE

Billions of computer devices are deployed in a variety of roles across the world. Many of these devices interact with users. Many users are not the sole owners or administrators of the devices. Users may be customers, clients, or coworkers of a device owner. Users may be using the device for a set of applications that is a subset of the full set of device applications.

Many devices contain applications with functionalities that may be determined inappropriate for a user. Many devices contain applications with sensitive information. Information may be considered sensitive if it can cause harm. Information may also be considered sensitive if the proprietor of the information wants it to remain private. Additionally, many devices contain applications with control over device settings.

For example, a user at a testing center may be taking an examination on a device owned by the testing center. In such an example, it may be inappropriate for the user to access any application other than the testing applications, e.g., a messaging application or a web browser.

In another example, a financial institution may provide tablet computers with multiple applications intended to assist clients. The applications may contain educational information about financial products offered by the institution. The applications may also assist clients in managing those financial products. It may be inappropriate for a client to access applications on the tablet other than the applications intended for the client. An inappropriate application may include, for example, confidential financial information. It may further be inappropriate for a client to access applications that control device settings, as well as applications that do not pertain to the intended user experience.

It would therefore be desirable to provide a restricted user experience that prevents a user from accessing applications inappropriate to the intended user experience. It would be further desirable to enable a user to access, during such a restricted user experience, multiple appropriate applications, and prevent the access to all other applications.

SUMMARY OF THE INVENTION

An apparatus for enabling a restricted multiple-application user experience is provided. The apparatus may include a processor. The apparatus may include a display. The apparatus may include one or more non-transitory computer-readable media. The media may store a plurality of computer applications. The applications may contain computer-executable instructions. When the applications are executed by the processor, they may be in a running state and provide functionality to the apparatus. The functionality may include displaying content on the display.

The applications may include at least one unrestricted application and a plurality of single-application (SA) applications. The plurality of SA applications may include a dashboard application and at least one peripheral application. Each of the plurality of SA applications may include an SA mode. The SA mode may be activated every time the SA application begins running.

The active SA mode of a running SA application may prevent all applications, aside from the running SA application, from running while the SA application is running. The active SA mode may also prevent the running SA application from exiting. The active SA mode may also remain active until the occurrence of a deactivation event. A deactivation event may be one of a set of one or more predetermined deactivation events. The occurrence of a predetermined deactivation event may deactivate the active SA mode of the running SA application.

Each of the plurality of SA applications may be configured to define at least one transfer event. A transfer event may occur independently of the entry of a password. A transfer event may be defined as a deactivation event.

When a predetermined transfer event occurs during the running of an SA application, a sequence of actions may be executed, as follows. Firstly, the SA mode of the running SA application may be deactivated. Secondly, the running SA application may exit from running. Thirdly, a predetermined SA application may be called to run, whereupon the SA mode of the called SA application may be activated. A transfer event may thereby enable a user to transfer and navigate from one SA application to another in a multiple-application experience. The user may be subjected to the SA mode restrictions of each SA application that is run throughout the multiple-application experience.

The dashboard application may be configured to define an escape event in addition to the transfer events. The transfer events of the dashboard application may be configured to enable a user to transfer to the peripheral applications. The escape event may depend upon the entry of a password. The escape event may be defined as a deactivation event.

When the escape event occurs during the running of the dashboard application, a sequence of actions may be executed. Firstly, the SA mode of the dashboard application may be deactivated. Secondly, the dashboard application may exit from running. Thirdly, a predetermined unrestricted application may be called to run. An unrestricted application may be an application without the restrictions of an SA mode.

The password dependent escape event of the dashboard application may be the only way for a user of the apparatus to navigate out of the restricted multiple-application user experience and run an unrestricted application. The transfer events of the dashboard application may enable a user to navigate directly to the peripheral applications. The dashboard application may thereby act as a gateway for the multiple-application user experience.

In certain embodiments, a user may be presented the apparatus with the dashboard application running. The user may be able to implement the transfer events and navigate between the multiple SA applications. An apparatus owner or administrator may be able to exit the restricted multiple-application experience via the password dependent escape event of the dashboard application.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
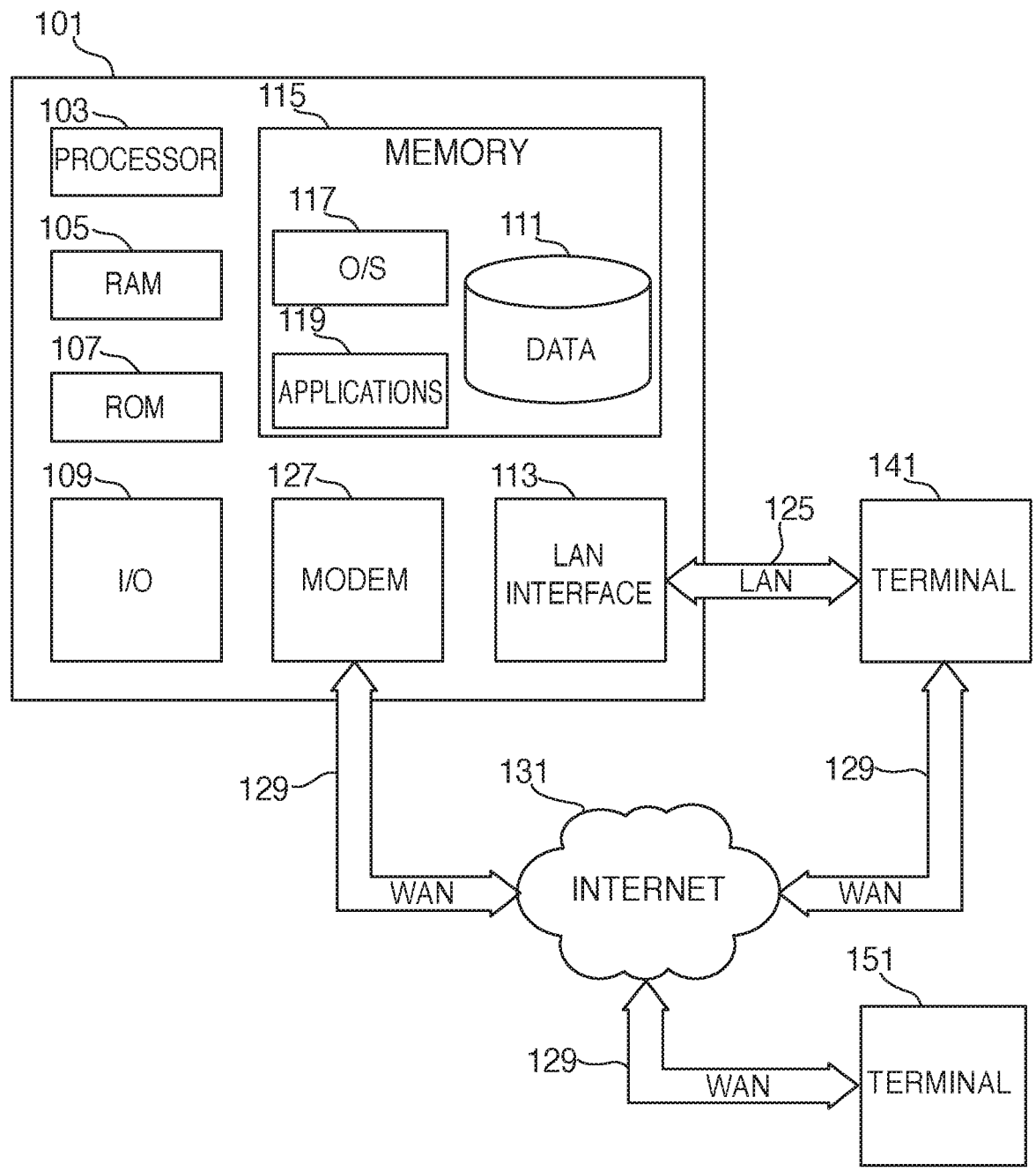
FIG. 1 shows an illustrative apparatus in accordance with principles of the disclosure.

Methods and apparatus for enabling a restricted multiple-application user experience on a computerized device are provided. The methods and apparatus may include the linking of a plurality of individual single-application (SA) modes, as will be described in the paragraphs below. The device may include a processor. The device may include a display. The device may include one or more non-transitory computer-readable media. The media may store a plurality of computer applications. The applications may contain computer-executable instructions. An application may be a computer program. When the applications are executed by the processor, they may be in a running state and provide functionality to the device. The functionality may display content on the display.

The applications may include at least one unrestricted application and a plurality of SA applications. The plurality of SA applications may include a dashboard application and at least one peripheral application. Each of the plurality of SA applications may include an SA mode. The SA mode may be activated every time the SA application begins running.

The active SA mode of a running SA application may prevent all applications, aside from the running SA application, from running while the SA application is running. The active SA mode may also prevent the running SA application from exiting. The active SA mode may also remain active until the occurrence of a deactivation event. A deactivation event may be one of a set of one or more predetermined deactivation events. The occurrence of a predetermined deactivation event may deactivate the active SA mode of the running SA application.

Each of the plurality of SA applications may be configured to define at least one transfer event. A transfer event may occur independently of the entry of a password. A transfer event may be defined as a deactivation event.

When a predetermined transfer event occurs during the running of an SA application, a sequence of actions may be executed, as follows. Firstly, the SA mode of the running SA application may be deactivated. Secondly, the running SA application may exit from running. Thirdly, a predetermined SA application may be called to run, whereupon the SA mode of the called SA application may be activated. A transfer event may thereby enable a user to transfer and navigate from one SA application to another in a multiple-application experience. The user may be subjected to the SA mode restrictions of each SA application that is run throughout the multiple-application experience. Thus, a plurality of individual SA modes may be linked. Pursuant to the linking, the user may be provided a restricted multiple-application user experience.

The dashboard application may be configured to define an escape event in addition to the transfer events. The transfer events of the dashboard application may be configured to enable a user to transfer to the peripheral applications. The escape event may depend upon the entry of a password. The escape event may be defined as a deactivation event.

When the escape event occurs during the running of the dashboard application, the SA mode of the dashboard application may be deactivated. In certain embodiments, when the escape event occurs during the running of the dashboard application, a sequence of actions may be executed, as follows. Firstly, the SA mode of the dashboard application may be deactivated. Secondly, the dashboard application may exit from running. Thirdly, a predetermined unrestricted application may be called to run.

The password dependent escape event of the dashboard application may be the only way for a user of the device to navigate out of the restricted multiple-application user experience and run an unrestricted application. The transfer events of the dashboard application may enable a user to navigate directly to the peripheral applications. The dashboard application may thereby act as a gateway for the multiple-application user experience.

In certain embodiments, a user may be presented the device with the dashboard application running. The user may be able to implement the transfer events and navigate between the multiple SA applications. A device owner or administrator may be able to exit the restricted multiple-application experience via the password dependent escape event of the dashboard application.

In certain embodiments, the escape event of the dashboard application may include the correct entry of a preset password in response to a password prompt. The password prompt may be displayed in response to a predetermined gesture. The gesture may include pressing a physical button attached to the device. The gesture may include a voice command. The voice command may be detected by a microphone attached to the device.

The gesture may also include pressing a predetermined location or set of locations on the display. The display may include a touchscreen that can sense pressure applied to the display. The predetermined location on the display may be a displayed button. The predetermined location on the display may be a displayed icon. The button or icon may indicate that it initiates an exit from the restricted experience. The predetermined set of locations on the display may include pressing anywhere on the display.

The pressing in the gesture may be a pressing for longer than a predetermined threshold duration. The threshold duration may be any suitable length of time that distinguishes the gesture as intentional. Exemplary threshold durations may be 2, 3, 4, 5, 6, or 7 seconds.

In certain embodiments, the transfer events of the SA applications may include the pressing of a button. The button may be a physical button attached to the device. The button may also be displayed on the display. The display may include a touchscreen that can sense pressure applied to the display. The button may indicate the SA application that will be called to run by the transfer event.

An exemplary device may contain a dashboard application and two peripheral applications. The two peripheral applications may be called Red app and Blue app. The dashboard application may define two transfer events and an escape event. Each one of the transfer events may call one of the two peripheral applications. The dashboard application may display two icons to a touchscreen. A red icon may show the text "Red app". Pressing the red icon may constitute a transfer event to call the Red app. A blue icon may show the text "Blue app". Pressing the blue icon may constitute a transfer event to call the Blue app. The escape event may be defined as the correct entry of a password in response to a password prompt. The password prompt may be displayed in response to a 5-second press anywhere on the touchscreen. A successfully implemented escape event may deactivate the SA mode of the dashboard application and terminate the restricted multiple-application experience.

In certain embodiments, an unrestricted application called, or enabled to run, by the escape event of the dashboard application may be a home-page. The home page may have access to control of administrative settings of the device. The home page may also have access to at least one additional unrestricted application. For example, the home page may include a settings component where a user is able to make changes to device settings. The home page may also include an icon or a link to a web browser.

In certain embodiments, the configuration of an SA application with an SA mode may include the iOS feature called Single App Mode (SAM). Other embodiments may include the iOS feature called Autonomous SAM (ASAM). Other embodiments may include any other suitable features and/or programs in the configuration of the SA mode.

SAM and ASAM may include the use of mobile device management (MDM). MDM may enable the management of one or more devices via an administrative server. Examples of MDM may be SimpleMDM, JAMF Pro, and Hexnode MDM. The SA mode may include the use of the iOS Supervised administrative setting. The SA mode may also include the iOS Device Enrollment Program (DEP). The SA mode may also include the use of iOS Configurator or Configurator2 features.

MDM may enable the enforcement of the SA mode. MDM may also enable the administrative server to distribute applications to the devices. MDM may also enable the administrative server to manage the applications on the devices.

The SA applications may be configured to relate to each other with a plurality of diverse architectures. The diverse architectures may include different ways of linking the SA applications to each other. The different ways of linking may involve configurations of the transfer events of the SA applications. The different ways of linking may enable diverse user experiences. The following paragraphs describe some exemplary embodiments of diverse architectures.

The SA applications of the device may be configured in a basic hub-and-spoke architecture. A hub-and-spoke architecture may contain a single centralized hub that is connected to a plurality of surrounding spokes. In this embodiment, the dashboard application of the device may be a hub. Each of the one or more peripheral applications may be a spoke. The dashboard application may define, in addition to the escape event, one or more transfer events. Each transfer event may navigate a user to a peripheral application. Each of the peripheral applications may define only one transfer event. The one transfer event may navigate a user to the dashboard application. The basic hub-and-spoke configuration may enable a user to navigate between the hub and the one or more spokes. The basic hub-and-spoke configuration may further prevent a user from navigating directly from one spoke to another without navigating to the hub.

The SA applications of the device may be configured in a multi-tier hub-and-spoke architecture. A hub-and-spoke architecture may contain a single centralized hub that is connected to a plurality of surrounding spokes. In a multi-tier architecture, some of the spokes may lack a direct connection to the hub. Rather, there may be multiple levels of spokes. Tier-one spokes may be connected to the hub. Tier-two spokes may be connected to tier-one spokes, and so on. In an embodiment with a multi-tier hub-and-spoke architecture, the dashboard application may be a hub. A plurality of peripheral applications may extend from the hub as one or more chains of spokes. Each chain may contain a first peripheral application as a tier-one spoke. Each chain may extend to further contain at least one additional peripheral application. The additional applications may be referred to as a succession of higher-numbered tiers of spokes.

In the multi-tier hub-and-spoke architecture, the dashboard application may define one or more transfer events in addition to the escape event. Each transfer event may enable a user to navigate to a tier-one peripheral application of a particular chain of spokes. Each of the tier-one peripheral applications may define a first transfer event. The first transfer event may enable a user to navigate from the tier-one peripheral application to the dashboard application. If the tier-one peripheral application is part of a chain that contains a tier-two peripheral application, the tier-one peripheral application of the chain may further define a second transfer event. The second transfer event may enable a user to navigate from the tier-one peripheral application to the tier-two peripheral application.

In the multi-tier hub-and-spoke architecture, a chain of spokes may extend further from tier-two to the end of the chain. Each Nth-tier peripheral application, where N represents the numerical tier level of the peripheral application, may define a first transfer event. The first transfer event may navigate a user from tier N to tier N−1. If the chain comprises a tier N+1, a second transfer event may be defined that navigates a user from tier N to tier N+1. The multi-tier hub-and-spoke configuration may enable a user to navigate the length of each chain of spokes, as well as navigate from the chains of spokes to the hub. The multi-tier hub-and-spoke configuration may further prevent a user from navigating directly from one chain of spokes to another without navigating to the hub.

The SA applications of the device may be configured in a meshed hub-and-spoke architecture. A hub-and-spoke architecture may contain a single centralized hub that is connected to a plurality of surrounding spokes. A meshed hub-and-spoke architecture may include connections between the spokes. In a meshed hub-and-spoke embodiment, the dashboard application may be a hub. Each one of two or more peripheral applications may be a spoke. The dashboard application may define one or more transfer events in addition to the escape event. Each transfer event may navigate a user to a peripheral application. At least one peripheral application may define a transfer event that enables a user to navigate to another peripheral application. The meshed hub-and-spoke configuration may enable a user to navigate between the hub and at least one spoke. The meshed hub-and-spoke configuration may further enable a user to navigate directly from at least one spoke to at least another.

The meshed hub-and-spoke architecture may be configured as a fully-meshed hub-and-spoke architecture. A full mesh may include a system architecture wherein each element in the system is directly connected to every other element in the system. In a fully-meshed hub-and-spoke embodiment, each of the SA applications may define a set of transfer events. The set of transfer events may be mapped to a comprehensive set of all the other SA applications. Each transfer event of the set may navigate a user to the SA application to which the transfer event is mapped. The fully-meshed hub-and-spoke configuration may enable a user to navigate bilaterally between the hub and all of the spokes. The fully-meshed hub-and-spoke configuration may further enable a user to navigate directly from any one spoke to any other spoke.

Certain embodiments of the disclosure may include a server. The server may be located in a remote location from the display, the processor, and the media. The server may include MDM technology. The server may enforce the restrictions of SA modes of the SA applications.

Certain embodiments of the disclosure may prevent an unrestricted application from running during a handoff state in a transfer. A transfer may be initiated by a transfer event. A transfer event of a first SA application may occur during the running of the first SA application. The transfer concludes when a user is navigated to a second SA application. The handoff state may be the period after the SA mode of the first SA application deactivates and before the SA mode of the second SA application activates. The handoff state may present a vulnerable period in which an unrestricted application can theoretically be run.

In some embodiments, the handoff state vulnerability may be addressed by relying on the sequential execution of computer instructions. The transfer event calls the second SA application substantially immediately after deactivating the SA mode of the first SA application and exiting. Practically speaking, there is no way to call an unrestricted application during the handoff state. In certain embodiments, the handoff state vulnerability may be addressed with a secure-handoff element.

The secure-handoff element may include a transfer indicator and a transfer register. The indicator and register may include hardware and/or software for storing information. When a transfer event defined in a first SA application occurs during the running of a first SA application, the first SA application may communicate to the secure-handoff element that a transfer is impending. The transfer indicator, which is by default set to an off setting, may then be toggled to an on setting. The first SA application may also communicate to the secure-handoff element the identity of the second SA application that the transfer event calls. The transfer register may be set to store information identifying the second SA application.

The secure-handoff element may address the vulnerability of the handoff state as follows. While the transfer indicator is toggled to an on setting, the secure-handoff element may prevent all applications from running, except for the application identified in the transfer register. Upon the activation of the SA mode of the second SA application, the transfer indicator may be toggled to an off position.

Methods and apparatus for enabling an SA mode to provide a restricted multiple-application user experience on a computerized system are provided. The system may include a processor. The system may include a display. The system may include one or more non-transitory computer-readable media. The media may store a plurality of computer applications. The applications may contain computer-executable instructions. When the applications are executed by the processor, they may be in a running state and provide functionality to the system. The functionality may include the ability to display content on the display.

One of a plurality of applications stored on the media may be configured as a dashboard application. A plurality of the remaining applications stored on the media may be configured as nested applications.

The dashboard application may be configured with a nested SA mode. The nested SA mode may be activated every time the dashboard application begins running on the processor. The nested SA mode may prevent all applications, aside from the dashboard application, from running independently while the dashboard application is running. The nested SA mode may allow only the nested applications to run within the dashboard application. In some embodiments, the dashboard application may display a window within which the nested application may appear. In certain embodiments, the nested application may run in the foreground and the dashboard application may run in the background.

The nested SA mode may prevent the dashboard application from exiting. The nested SA may remain active until the occurrence of a predetermined escape event. The escape event may involve the entry of a password. The escape event may be predetermined by the dashboard application. The occurrence of the predetermined escape event of the dashboard application during the running of the dashboard application may deactivate the nested SA mode of the dashboard application. In certain embodiments, the occurrence of the predetermined escape event of the dashboard application during the running of the dashboard application may execute the following sequence of actions. Firstly, the nested SA mode of the dashboard application may be deactivated. Secondly, the dashboard application may exit from running. Thirdly, the user may be navigated out of the restricted experience and an unrestricted application may be called to run.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 based on computer 101. The computer 101 may have a processor 103 for controlling the operation of the device and its associated components, and may include RAM 105, ROM 107, input/output module 109, and a memory 115. The processor 103 will also execute all software running on the computer—e.g. the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may be included in a transfer event or an escape event. The input/output module may also include one or more speakers for providing audio output and a video display device for providing textual, audio, audiovisual, and/or graphical output. The input and output may be related to computer application functionality.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server need not stream the data to the computer system. This may be beneficial for the computer system, because the retrieval may be faster than data-streaming. Users may not become frustrated because they do not need to wait to run the applications. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications.

Computer 101 and/or terminals 141 and 151 may also be devices including various other components, such as a battery, speaker, antennas (not shown).

Terminal 151 and/or terminal 141 may be portable devices such as a laptop, cell phone, Blackberry™, smartphone, or any other suitable device for storing, transmitting and/or transporting relevant information. Terminals 151 and/or terminal 141 may be other devices. These devices may be identical to system 100 or different. The differences may be related to hardware components and/or software components.

Figure 2:
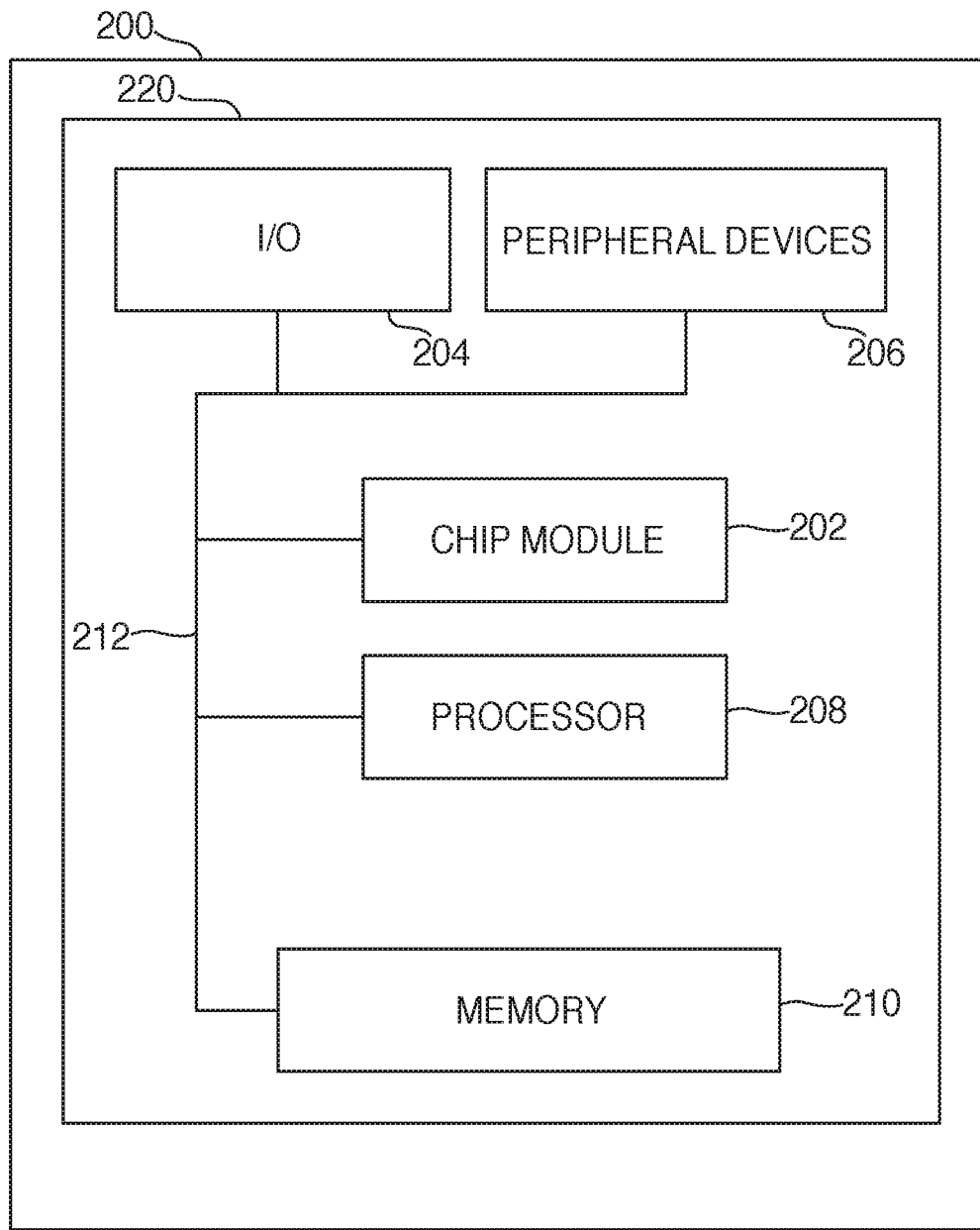
FIG. 2 shows another illustrative apparatus in accordance with principles of the disclosure.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver cable and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information, structural parameters of the data, predict possible cursor trajectories and machine-readable memory 210.

Machine-readable memory 210 may be configured to store in machine-readable data structures: information pertaining to a user, assistance videos, audio assistance, textual assistance, information pertaining to a webpage, information pertaining to technical difficulties users encountered with a webpage, information pertaining to a pixel grid associated with a display, information pertaining to cursor trajectories, information pertaining to sections of a webpage, information pertaining to a cursor movement, information pertaining to cursor movement as related to webpage sections and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon based.

FIGS. 3-6 illustrate diverse architectures for the relationships between a plurality of SA applications of the disclosure. A relationship may be a link between two applications. A link may represent a transfer event that enables a user to navigate from one application to the other. A link may be bilateral. A bilateral link may represent transfer events defined on both sides of the link that enable a user to navigate bi-directionally over the link. A solid-line portrayal of a link in FIGS. 3-6 may represent a link that keeps a user within the restricted multiple-application experience. A dotted-line portrayal of a link in FIGS. 3-6 may represent a link that enables a user to exit the restricted multiple-application experience.

Figure 3:
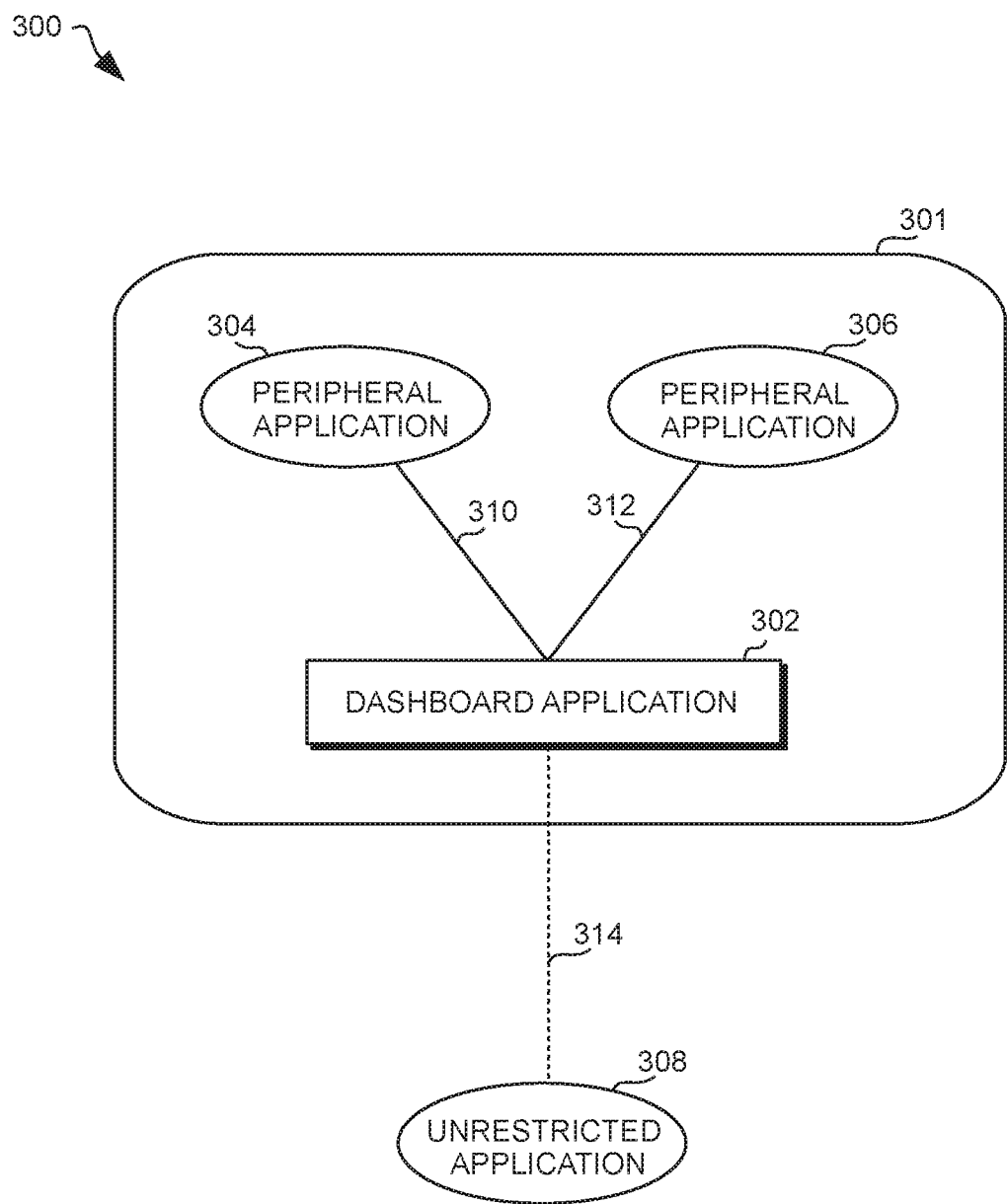
FIG. 3 shows an illustrative diagram in accordance with certain embodiments of the disclosure.

FIG. 3 shows an illustrative architecture 300. Architecture 300 may represent a basic hub-and-spoke model for the relationships between the plurality of SA applications. A dashboard application 302 may define two transfer events. One transfer event may enable a user to navigate to peripheral application 304. This ability to navigate may be represented by link 310. Link 310 may be a bilateral link. A link may be bilateral if a user can navigate both ways across the link. Link 310 may be bilateral if peripheral application 304 defines a transfer event that enables a user to navigate to the dashboard application. Dashboard application 302 may define a second transfer event that enables a user to navigate to peripheral application 306. The ability to navigate from 302 to 306 may be represented by link 312. Link 312 may be bilateral if peripheral application 306 defines a transfer event to the dashboard application 302.

The dashboard application 302 may define an escape event that enables a user to transfer to an unrestricted application 308 over link 314. The escape event may depend upon the correct entry of a password. Link 314 may enable the user to exit from the restricted multiple-application user experience 301.

Figure 4:
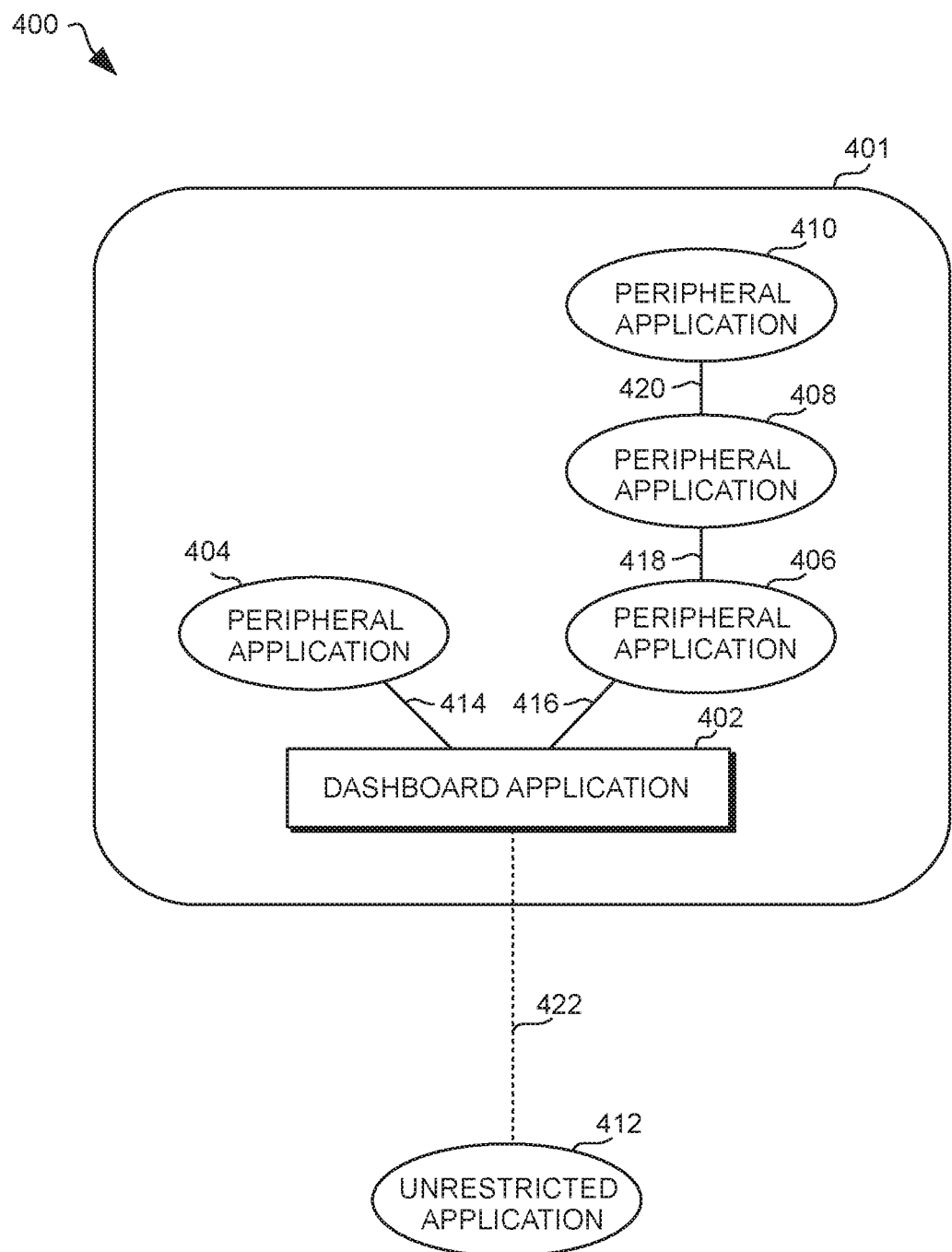
FIG. 4 shows another illustrative diagram in accordance with certain embodiments of the disclosure.

FIG. 4 shows an illustrative architecture 400. Architecture 400 may represent a multi-tiered hub-and-spoke configuration. Within a restricted multiple-application user experience 401, a dashboard application 402 may include two bilateral links, 414 and 416. Links 414 and 416 may enable a user to navigate from the dashboard application 402 to two tier-one peripheral applications, 404 and 406. Application 406 may be part of a three-tiered chain of applications. The three-tiered chain may include peripheral applications 406, 408, and 410. The applications in the chain may be connected with bilateral links. Tier-one peripheral application 406 may be connected to tier-two peripheral application 408 via link 418. Tier-two peripheral application 408 may be connected to tier-three peripheral application 410 via link 420. A user may be unable to navigate directly from application 410 to application 404. A user may also be unable to navigate from application 410 directly to the hub, or even directly to the tier-one application 406. If a user is running application 410 and they wish to access application 404, the user may need to navigate to application 408, then 406, then the dashboard application, and finally to 404.

The dashboard application 402 may define an escape event that enables a user to transfer to an unrestricted application 412 over link 422. The escape event may depend upon the correct entry of a password. Link 422 may enable the user to exit from the restricted multiple-application user experience 401.

Figure 5:
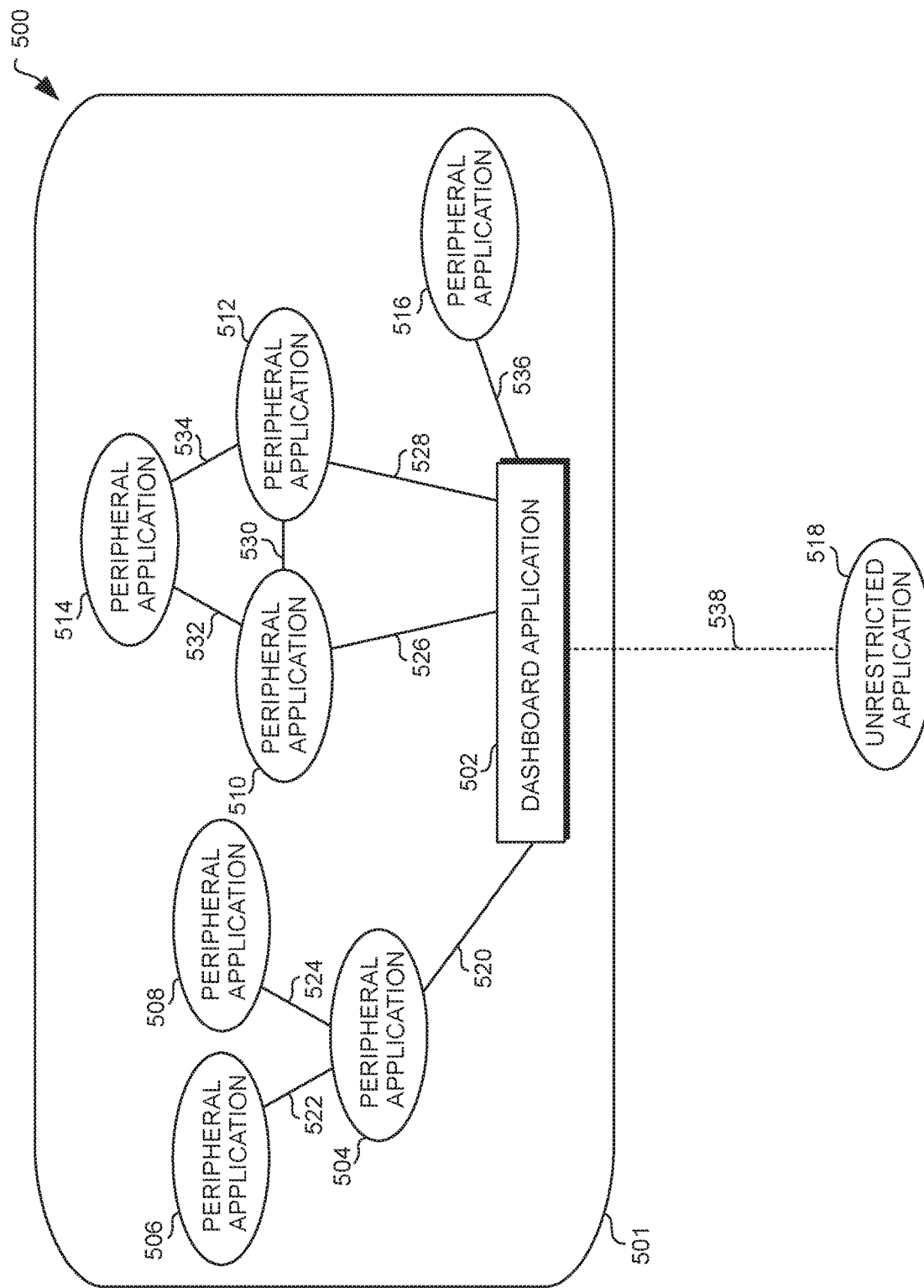
FIG. 5 shows another illustrative diagram in accordance with certain embodiments of the disclosure.

FIG. 5 shows an illustrative architecture 500. Architecture 500 may represent a meshed hub-and-spoke configuration. Peripheral applications 504, 510, 512, and 516 may be connected to the dashboard application 502 via bilateral links 520, 526, 528, and 530, respectively. Peripheral applications 506 and 508 may be connected to application 504 via bilateral links 522 and 524, respectively. Peripheral applications 510 and 512 may be directly connected via bilateral link 530. Peripheral application 514 may be connected to applications 510 and 512, via bilateral links 532 and 534, respectively. The meshed architecture of 500 may provide direct links between peripheral applications. The direct links enable a user to navigate directly from one peripheral application to another, without accessing the dashboard application. Link 538 may enable a user to exit the restricted multiple-application user experience 501. A user may need to implement a password dependent escape event in the dashboard application 502 to navigate to an unrestricted application 518 via link 538.

Figure 6:
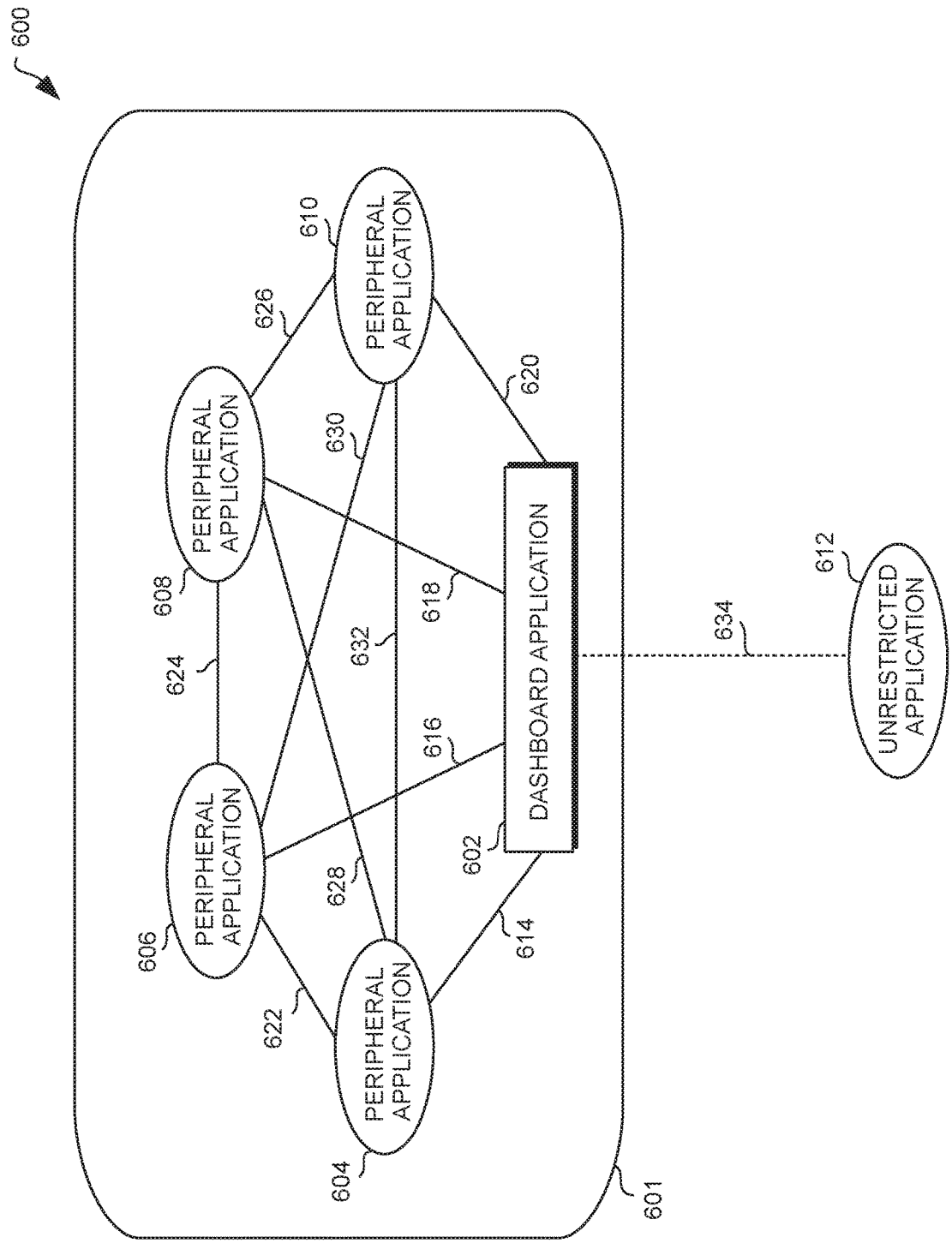
FIG. 6 shows another illustrative diagram in accordance with certain embodiments of the disclosure.

FIG. 6 shows an illustrative architecture 600. Architecture 600 may represent a fully meshed hub-and-spoke configuration. There is one primary distinction between the fully meshed model of architecture 600 and the basic meshed model of architecture 500. A basic meshed model may be partially meshed, as in 500. In a partially meshed model, some of the elements in the model may not be connected to all the other elements. By contrast, in the fully meshed model of 600, each of the SA applications include a direct link to all of the other SA applications. Accordingly, in architecture 600, each element of the set of SA applications: dashboard application 602; peripheral application 604; peripheral application 606; peripheral application 608; and peripheral application 610; all include direct bilateral links to all the other elements of the set. In architecture 600, a user may navigate directly between all the SA applications within restricted multiple-application experience 601. Implementing an escape event in dashboard application 602 may enable a user to access an unrestricted application 612 via link 634.

Figure 7:
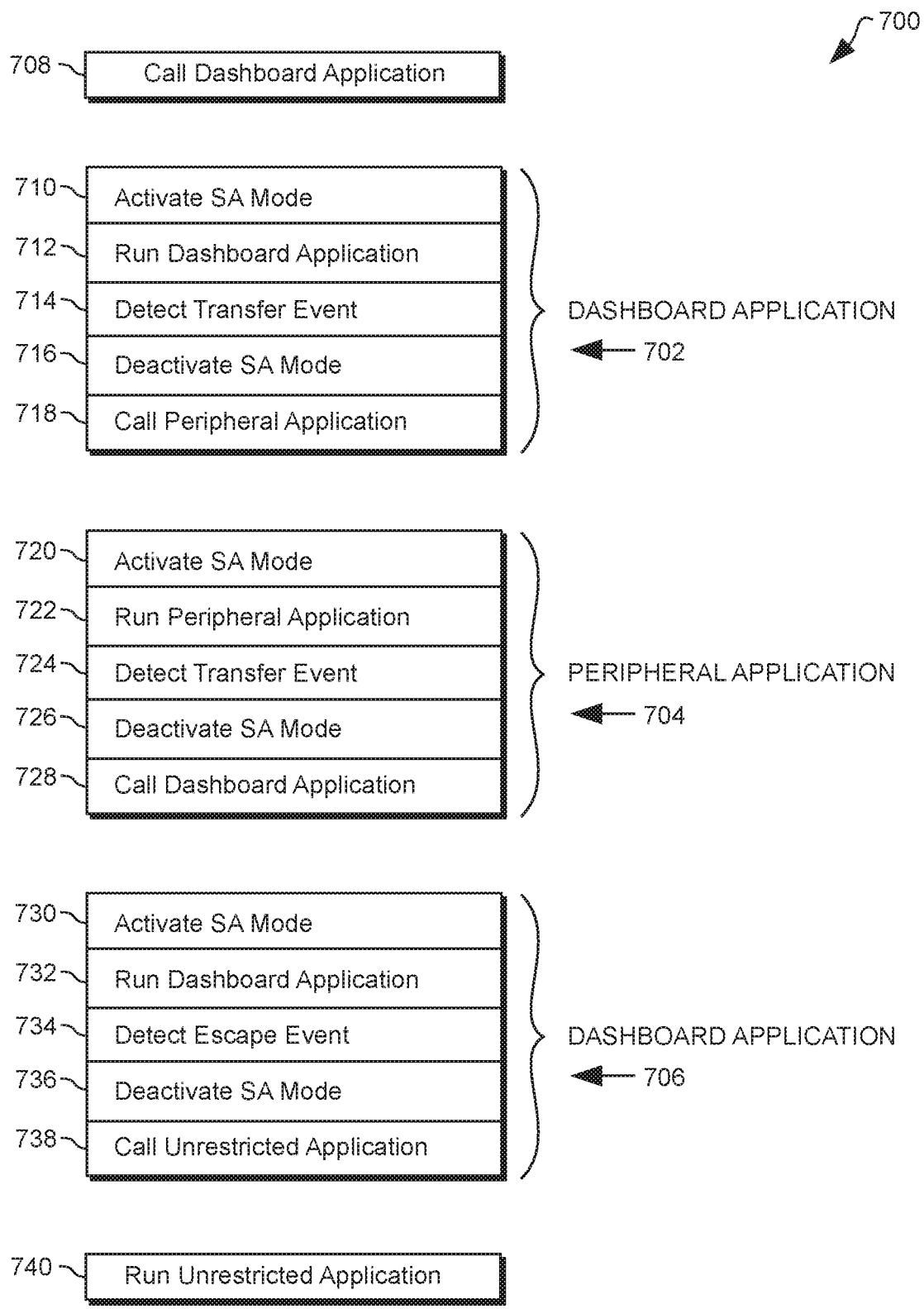
FIG. 7 shows another illustrative diagram in accordance with principles of the disclosure.

FIG. 7 shows an illustrative flowchart 700. Flowchart 700 may represent a sequence of steps to enable, as well as exit, a restricted multiple-application user experience. The first step, 708, calls the dashboard application. The dashboard application may be called by tapping a suitable icon on a display. When the dashboard application is called, it substantially immediately activates the SA mode in step 710. Step 712 represents the running of the dashboard application. Step 712 may include any suitable computer instructions for the running of the dashboard application. As an example, the dashboard application may display icons to the display. At step 714, a transfer event is detected. An exemplary transfer event may be the pressing of an icon on the display. Step 716 deactivates the SA mode of the dashboard application. Substantially immediately, step 718 calls a predetermined peripheral application.

Substantially immediately following step 718, step 720 activates the SA mode of the called peripheral application. The peripheral application runs in step 722. At step 724, a transfer event is detected. Step 726 deactivates the SA mode of the peripheral application. Substantially immediately, step 728 calls the dashboard application.

Substantially immediately following step 728, step 730 activates the SA mode of the dashboard application. The dashboard application runs in step 732. At step 734, an escape event is detected. Step 736 deactivates the SA mode of the dashboard application. Step 738 calls an unrestricted application. Step 740 runs an unrestricted application. At that point, the restricted multiple-application user experience is concluded.

Flowchart 700 may show a partial lifecycle of a restricted user experience. The flowchart begins at step 708 before any restricted experience is enabled. The flowchart concludes at step 740, after the restricted experience has been exited. The flowchart includes three sections. The first section, 702, represents the steps that take place in the dashboard application. The second section, 704, represents the steps that take place in a peripheral application. The third section, 706, represents the steps that once again take place in the dashboard application. Flowchart 700 shows how the portrayed sequence of steps enables a user experience that is restricted by single-application modes while allowing the user to access multiple applications.

FIGS. 8-12 illustrate an exemplary storyboard sequence of a restricted multiple-application user experience. In the exemplary experience, a computer device may contain a dashboard application and two peripheral applications. The two peripheral applications may be called Red app and Blue app. The dashboard application may define two transfer events and an escape event. Each one of the transfer events may call one of the two peripheral applications. The dashboard application may display two icons to a touchscreen. A red icon may show the text "Red app". Pressing the red icon may constitute a transfer event to call the Red app. A blue icon may show the text "Blue app". Pressing the blue icon may constitute a transfer event to call the Blue app. The escape event may be defined as the correct entry of a password in response to a password prompt. The password prompt may be displayed in response to a 5-second, or any other suitable amount of time, press anywhere on the touchscreen. A successfully implemented escape event may exit the dashboard application and terminate the restricted multiple-application experience.

Figure 8:
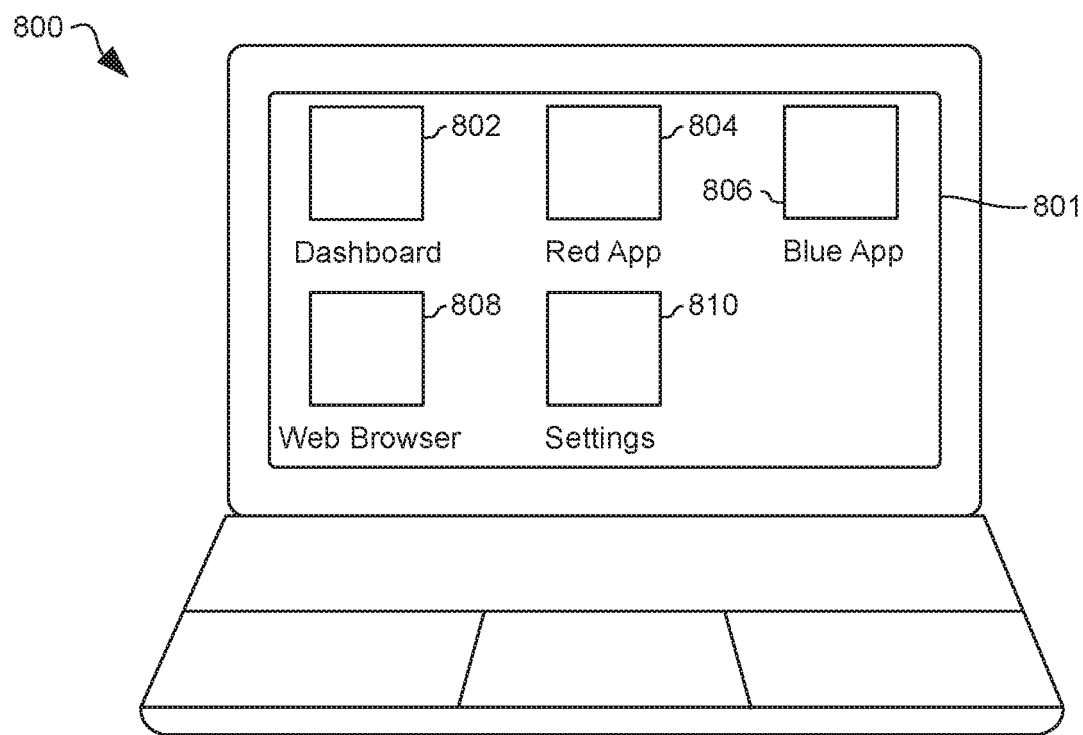
FIG. 8 shows another illustrative diagram in accordance with principles of the disclosure.

FIG. 8 shows a computer display 801. Display 801 may be a touchscreen on a computer device. For example, the device may be a computer tablet or a laptop computer. Display 801 may be a homepage that displays, and enables access to, a plurality of applications. The plurality of applications may include a dashboard application 802, Red app 804, Blue app 806, a web browser application 808, and a settings application 810. The device may be provided to a user. The user may not be a device owner or administrator. It may be intended for the user to access Red app 804 and Blue app 806. Applications 808 and 810 may be inappropriate for the user. To restrict the user experience to the intended applications, the device owner or administrator may run the dashboard application 802 prior to providing the user the device.

Figure 9:
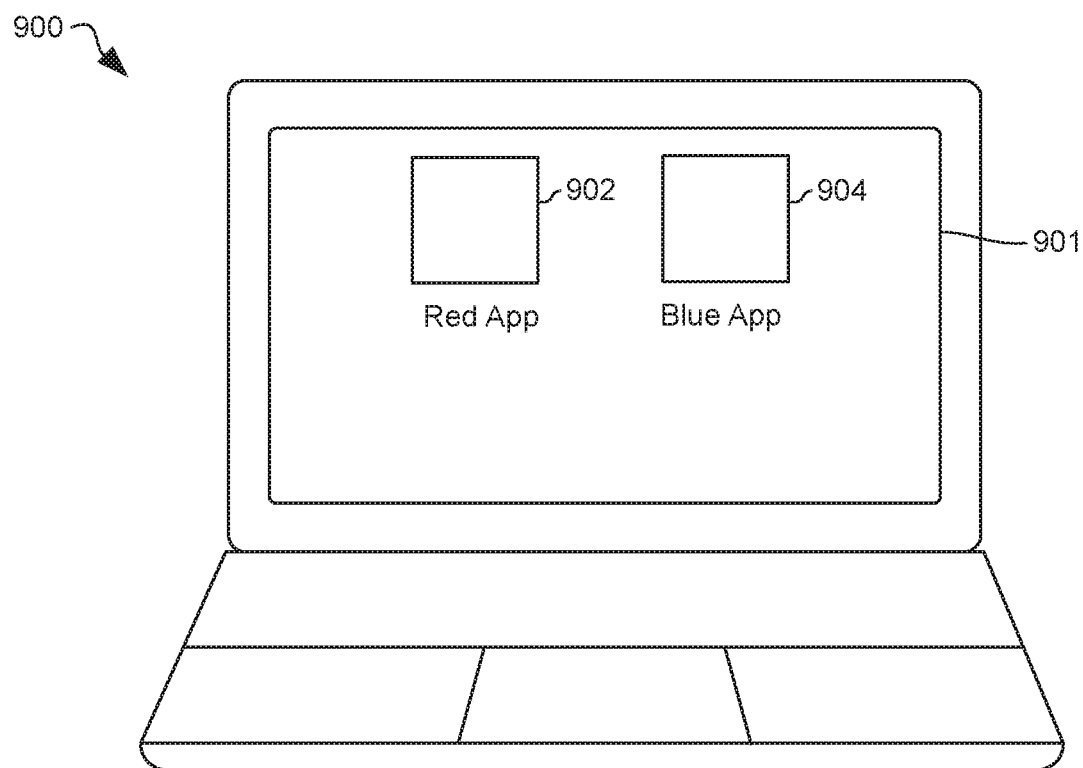
FIG. 9 shows yet another illustrative diagram in accordance with principles of the disclosure.

FIG. 9 shows a computer display 901. Display 901 may be a touchscreen on a computer tablet or a laptop computer. Display 901 may show a running dashboard application. Display 901 may be the display initially presented to a device user in a restricted multiple-application user experience. The user may be unable to access the homepage due to the active SA mode of the dashboard application. Pressing icon 902 may be a transfer event that transfers the user to the Red app peripheral application. Pressing icon 904 may be a transfer event that transfers the user to the Blue app peripheral application. Implementing the transfer events may deactivate the SA mode of the dashboard application, exit the dashboard application, and call the predetermined peripheral application. When the called peripheral application runs, the SA mode of the peripheral application activates.

Figure 10:
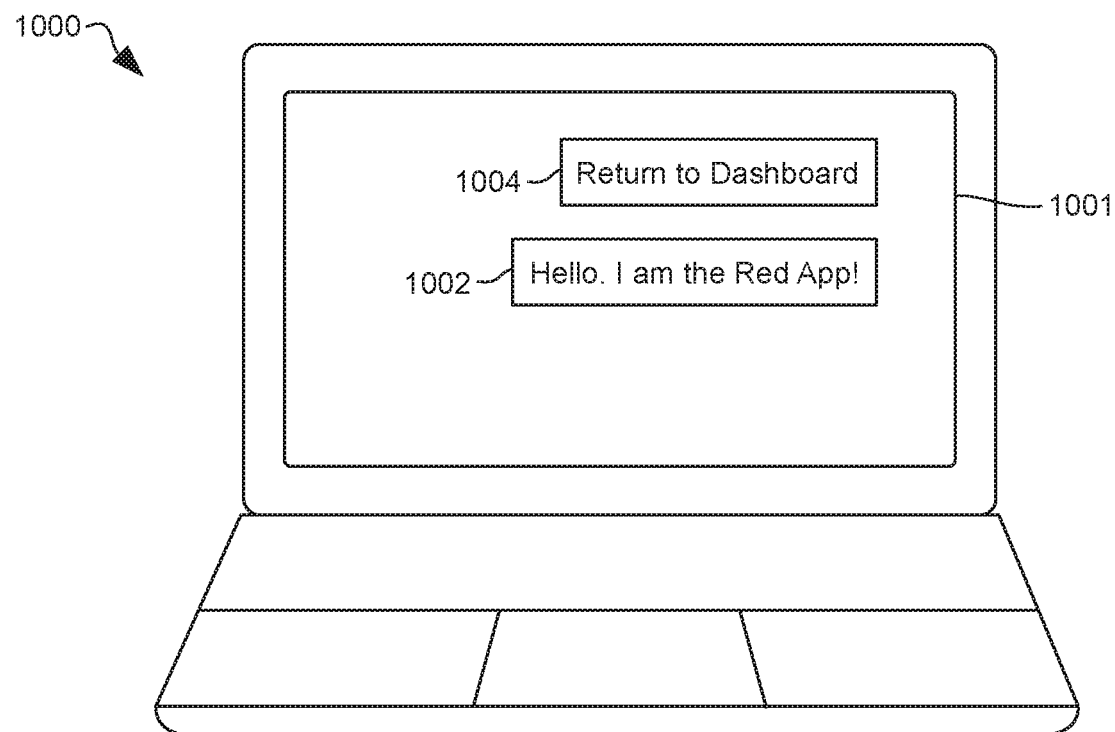
FIG. 10 shows still another illustrative diagram in accordance with principles of the disclosure.

FIG. 10 shows a computer display 1001. Display 1001 may be a touchscreen on a computer tablet or a laptop computer. Display 1001 may show a running Red app. The functionality of the Red app may be to display a text box 1002 showing "Hello. I am the Red App!". Pressing button 1004, which may display the text "Return to Dashboard", may be a transfer event that transfers the user back to the dashboard application. In other embodiments (not shown), the Red app might display information regarding a financial services product. Red app may enable a user to manage the product.

Figure 11:
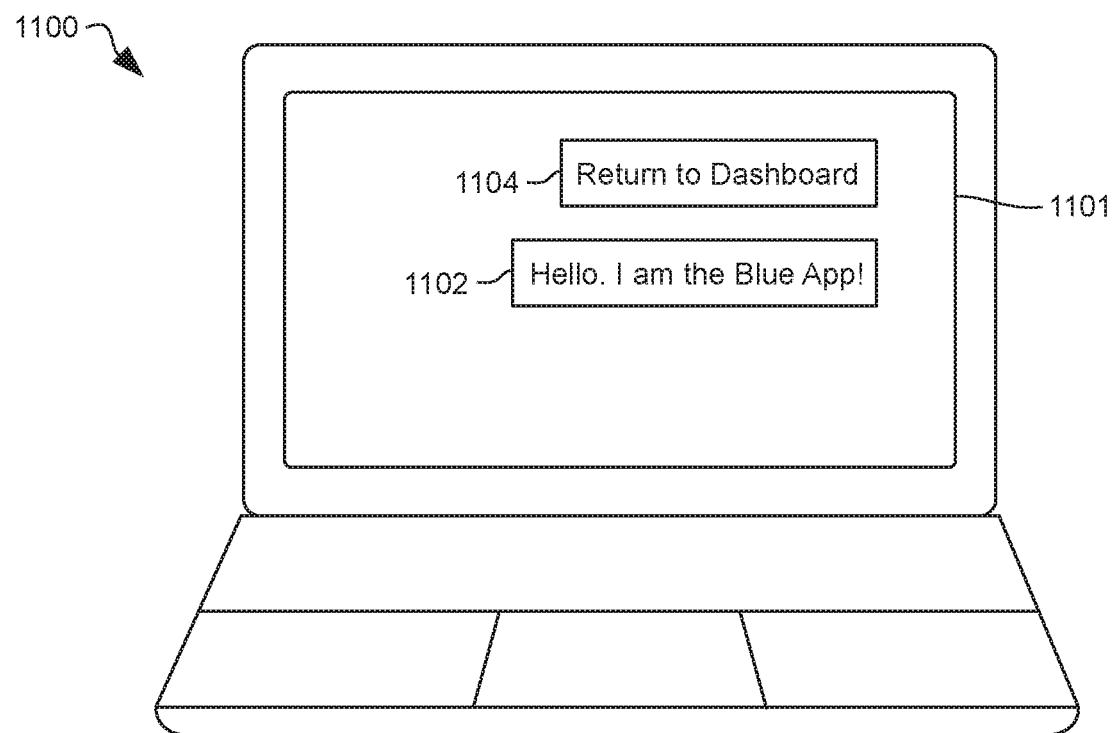
FIG. 11 shows an additional illustrative diagram in accordance with principles of the disclosure.

FIG. 11 shows a computer display 1101. Display 1101 may be a touchscreen on a computer tablet or a laptop computer. Display 1101 may show a running Blue app. The functionality of the Blue app may be to display a text box 1102 showing "Hello. I am the Blue App!". Pressing button 1104, which may display the text "Return to Dashboard", may be a transfer event that transfers the user back to the dashboard application. In other embodiments (not shown), the Blue app might display information regarding a financial services product. Blue app might even enable a user to manage the product.

A device user may be restricted to the three SA applications within the restricted multiple-application user experience. The user may be able to navigate from the dashboard application to the Red app, and back from the Red app to the dashboard application. The user may also navigate from the dashboard application to the Blue app, and back from the Blue app to the dashboard application.

A device owner or administrator, however, may need to navigate to the homepage. The owner/administrator may need to access the internet for a device update. The owner/administrator may need to change the device settings. To navigate to the homepage, the owner/administrator may implement an escape event in the dashboard application in FIG. 9. The escape event may be initiated with a long press gesture anywhere on the display 901. The long press gesture may be a 5-second-long press on the screen. The long press gesture may be a press on the screen for any suitable amount of time. The long press gesture may display a password prompt, shown in FIG. 12.

Figure 12:
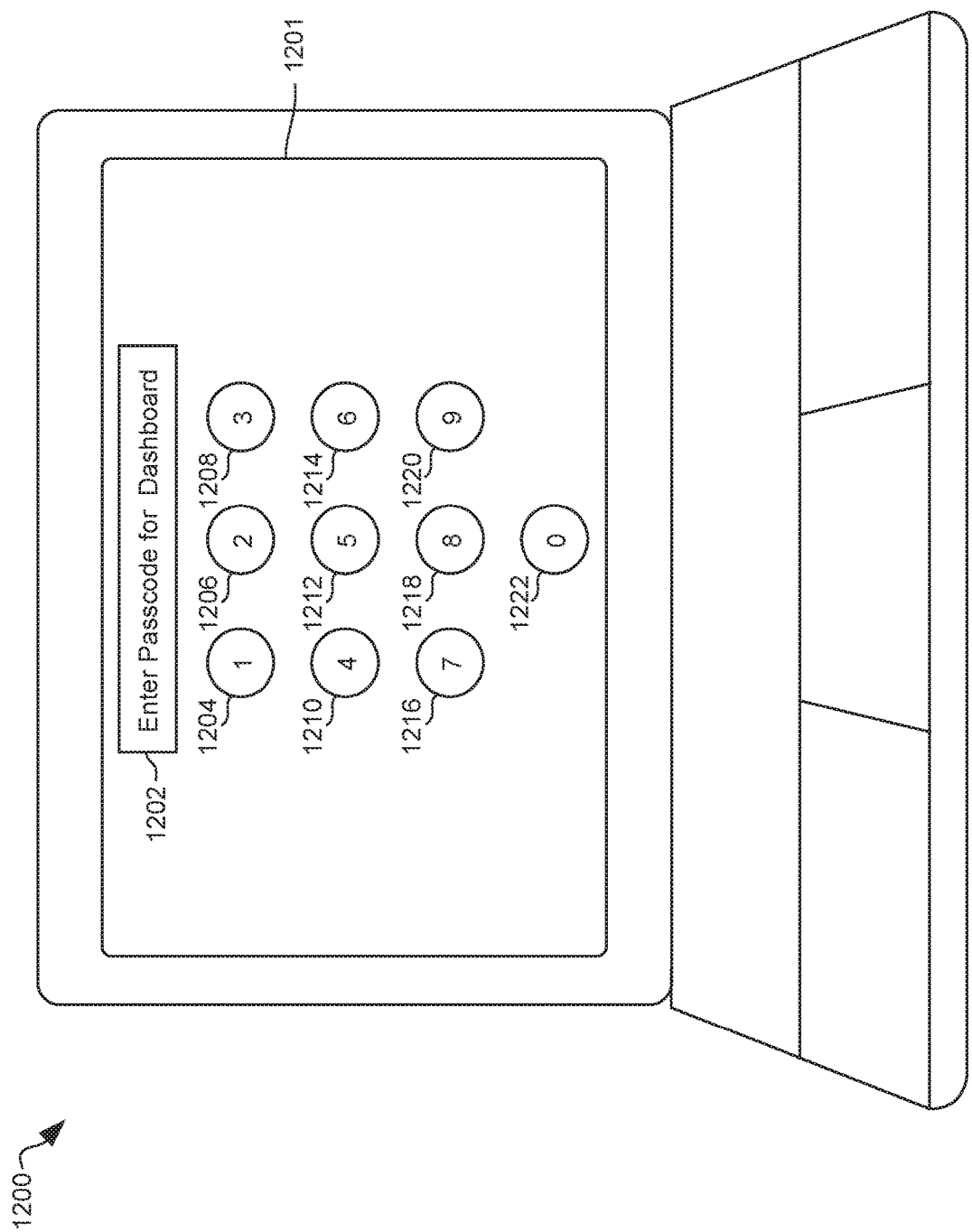
FIG. 12 shows another illustrative diagram in accordance with principles of the disclosure.

FIG. 12 shows a computer display 1201. Display 1201 may be a touchscreen on a computer tablet. Display 1201 may show a password prompt. The prompt may include a text box 1202 that shows the text "Enter Passcode for Dashboard". Below text box 1202, a plurality of buttons may be displayed. The buttons 1204-1222 (even numbers) may show the single digits for entering the password. The successful entry of a correct password may be the escape event. The escape event may deactivate the SA mode of the dashboard application. After the SA mode is deactivated, the dashboard application may exit. In some embodiments, a visual and/or audio indicator may confirm the deactivation of the SA mode. The indicator might be a graphic displayed on the screen. The graphic might be an unlocked padlock. The user may then be able to exit the dashboard application manually, e.g. by pressing the home button on a device. The homepage of FIG. 8. may then be run.

The exemplary experience illustrated in FIGS. 8-12 may utilize the computer executable code included as Tables A, B, and C. The code contains comments for explanatory purposes.

The code in Table A contains exemplary instructions for the running of the dashboard application. The initial loading function "viewDidLoad( )" may call the "enableSingleAppMode( )" function to activate the SA mode. The "viewDidLoad( )" function may also set up the Red App and Blue App buttons, as well as the gesture that displays the password prompt of the escape event. The function "presentPasscodeScreen( )" may provide instructions for the escape event. The function "enableSingleAppMode( )" may activate the SA mode. The function "disableSingleAppMode( )" may deactivate the SA mode. The function "disableSingleAppMode( )" may also display an unlocked padlock to the screen. The "handleLongPress( )" function may display the password prompt when the predetermined gesture occurs. The functions "RedAppButton( )" and "BlueAppButton( )" may provide instructions for the transfer events. The instruction "UIAccessibilityRequestGuidedAccessSession(false)" at the beginning of the transfer event functions may deactivate the SA mode of the running application.

TABLE A

```swift
// ViewController.swift
// DashboardApp-DEV
//
import UIKit
import LocalAuthentication
class ViewController: UIViewController {
    @IBOutlet weak var BlueAppButton: UIButton!
    @IBOutlet weak var RedAppButton: UIButton!
    @IBOutlet weak var padlockButton: UIButton!
    let authenticationContext = LAContext( )
    override func viewDidLoad( ) {
        super.viewDidLoad( )
        // Do any additional setup after loading the view, typically from a nib.
        enableSingleAppMode( )
        UIApplication.shared.isIdleTimerDisabled = true
        padlockButton.addTarget(self, action: #selector(padlockButton(_:)), for: .touchUpInside)
        BlueAppButton.addTarget(self, action: #selector(BlueAppButton(_:)), for: .touchUpInside)
        RedAppButton.addTarget(self, action: #selector(RedAppButton(_:)), for: .touchUpInside)
        //Setup Gesture Control
        let lpgr = UILongPressGestureRecognizer(target: self, action: #selector(self.handleLongPress(_:)))
        lpgr.minimumPressDuration = 5
        self.view.addGestureRecognizer(lpgr)
    }
    //Display device passcode screen to ask for authentication to unlock from Single App Mode
    func presentPasscodeScreen( ) {
        let myContext = LAContext( )
        let myLocalizedReasonString = "Enter Passcode to Exit Application"
        var authError: NSError?
        if myContext.canEvaluatePolicy(.deviceOwnerAuthentication, error: &authError) {
            myContext.evaluatePolicy(.deviceOwnerAuthentication, localizedReason: myLocalizedReasonString) { success, evaluateError in
                if success {
                    // User authenticated successfully, take appropriate action
                    self.disableSingleAppMode( )
                } else {
                    // User did not authenticate successfully, look at error and take appropriate action
                    NSLog("Authentication Error")
                }
            }
        } else {
            // Could not evaluate policy; look at authError and present an appropriate message to user
            NSLog("Policy Evaluation Error")
        }
    }
    // Lock into Single App mode.
    func enableSingleAppMode( ) {
        UIAccessibilityRequestGuidedAccessSession(true){
            success in
            let didSucceed = success;
            if (didSucceed) {
                NSLog("entered guided access");
                self.padlockButton.isHidden = true
            }
            else {
                NSLog("failed to enter guided access");
            }
        }
    }
    // UnLock from Single App mode.
    func disableSingleAppMode( ) {
        UIAccessibilityRequestGuidedAccessSession(false){
            success in
            let didSucceed = success;
            if (didSucceed) {
                NSLog("Exited guided access");
                self.padlockButton.isHidden = false
            }
            else {
                NSLog("failed to exit guided access");
            }
        }
    }
    //Long Press Gesture Actions
```

TABLE A-continued

```
    @objc func handleLongPress(_gestureReconizer: UILongPressGestureRecognizer) {
        if gestureReconizer.state == UIGestureRecognizerState.began {
            NSLog("Gesture Triggered!")
            self.presentPasscodeScreen( )
        }
    }
    //Action for Pressing BlueAppButton
    @objc func BlueAppButton(_ button: UIButton) {
        NSLog("Launching the blue app!")
        UIAccessibilityRequestGuidedAccessSession(false){
            success in
            let didSucceed = success;
            if (didSucceed) {
                NSLog("Exited guided access");
                //self.padlockButton.isHidden = false
                let app2Url: URL = URL(string: "BlueApp-DEV://")!
                UIApplication.shared.open(app2Url, options: [:], completionHandler: nil)
            }
            else {
                NSLog("failed to exit guided access");
            }
        }
    }
    //Action for Pressing RedAppButton
    @objc func RedAppButton(_ button: UIButton) {
        NSLog("Launching the red app!")
        UIAccessibilityRequestGuidedAccessSession(false){
            success in
            let didSucceed = success;
            if (didSucceed) {
                NSLog("Exited guided access");
                //self.padlockButton.isHidden = false
                let app2Url: URL = URL(string: "RedApp-DEV:// ")!
                UIApplication.shared.open(app2Url, options: [:], completionHandler: nil)
            }
            else {
                NSLog("failed to exit guided access");
            }
        }
    }
    //Action for Pressing padlockButton
    @objc func padlockButton(_ button: UIButton) {
        self.enableSingleAppMode( )
    }
    override func didReceiveMemoryWarning( ) {
        super.didReceiveMemoryWarning( )
        // Dispose of any resources that can be recreated.
    }
}
```

The code in Table B contains exemplary instructions for the running of the Red app. The initial loading function "viewDidLoad( )" may call the "enableSingleAppMode( )" function to activate the SA mode. The "viewDidLoad( )" function may also set up the return button, the pressing of which may be the transfer event to return to the dashboard application. The function "enableSingleAppMode( )" may activate the SA mode. The function "disableSingleAppMode( )" may deactivate the SA mode. The function "returnButton( )" may provide instructions for the transfer event that occurs by pressing the return button. The instruction "UIAccessibilityRequestGuidedAccessSession(false)" at the beginning of the "returnButton( )" function may deactivate the SA mode of the Red app.

TABLE B

```
//
// ViewController.swift
// RedApp-DEV
//
import UIKit
class ViewController: UIViewController {
    @IBOutlet weak var returnButton: UIButton!
    override func viewDidLoad( ) {
        super.viewDidLoad( )
        // Do any additional setup after loading the view, typically from a nib.
        enableSingleAppMode( )
        UIApplication.shared.isIdleTimerDisabled = true
        returnButton.addTarget(self, action: #selector(returnButton(_:)), for: .touchUpInside)
    }
    // Lock into Single App mode.
```

TABLE B-continued

```
func enableSingleAppMode( ) {
    UIAccessibilityRequestGuidedAccessSession(true){
        success in
        let didSucceed = success;
        if (didSucceed) {
            NSLog("entered guided access");
        }
        else {
            NSLog("failed to enter guided access");
        }
    }
}
// UnLock from Single App mode.
func disableSingleAppMode( ) {
    UIAccessibilityRequestGuidedAccessSession(false){
        success in
        let didSucceed = success;
        if (didSucceed) {
            NSLog("Exited guided access");
        }
        else {
            NSLog("failed to exit guided access");
        }
    }
}
//Action for Pressing returnButton
@objc func returnButton(_ button: UIButton) {
    NSLog("Returning to the dashboard!")
    UIAccessibilityRequestGuidedAccessSession(false){
        success in
        let didSucceed = success;
        if (didSucceed) {
            NSLog("Exited guided access");
            let app2Url: URL = URL(string: "DashboardApp-DEV://")!
            UIApplication.shared.open(app2Url, options: [:], completionHandler: nil)
        }
        else {
            NSLog("failed to exit guided access");
        }
    }
}
    override func didReceiveMemoryWarning( ) {
        super.didReceiveMemoryWarning( )
        // Dispose of any resources that can be recreated.
    }
}
```

The code in Table C contains exemplary instructions for the running of the Blue app. The initial loading function "viewDidLoad( )" may call the "enableSingleAppMode( )" function to activate the SA mode. The "viewDidLoad( )" function may also set up the return button, the pressing of which may be the transfer event to return to the dashboard application. The function "enableSingleAppMode( )" may activate the SA mode. The function "disableSingleAppMode( )" may deactivate the SA mode. The function "returnButton( )" may provide instructions for the transfer event that occurs by pressing the return button. The instruction "UIAccessibilityRequestGuidedAccessSession(false)" at the beginning of the "returnButton( )" function may deactivate the SA mode of the Blue app.

TABLE C

```
//
// ViewController. swift
// BlueApp-DEV
//
import UIKit
class ViewController: UIViewController {
    @IBOutlet weak var returnButton: UIButton!
    override func viewDidLoad( ) {
        super.viewDidLoad( )
        // Do any additional setup after loading the view, typically from a nib.
        enableSingleAppMode( )
        UIApplication.shared.isIdleTimerDisabled = true
        returnButton.addTarget(self, action: #selector(returnButton(_:)), for: .touchUpInside)
    }
    // Lock into Single App mode.
    func enableSingleAppMode( ) {
        UIAccessibilityRequestGuidedAccessSession(true){
            success in
```

TABLE C-continued

```
            let didSucceed = success;
            if (didSucceed) {
                NSLog("entered guided access");
            }
            else {
                NSLog("failed to enter guided access");
            }
        }
    }
    // UnLock from Single App mode.
    func disableSingleAppMode( ) {
        UIAccessibilityRequestGuidedAccessSession(false){
            success in
            let didSucceed = success;
            if (didSucceed) {
                NSLog("Exited guided access");
            }
            else {
                NSLog("failed to exit guided access");
            }
        }
    }
    //Action for Pressing returnButton
    @objc func returnButton(_ button: UIButton) {
        NSLog("Returning to the dashboard!")
        UIAccessibilityRequestGuidedAccessSession(false){
            success in
            let didSucceed = success;
            if (didSucceed) {
                NSLog("Exited guided access");
                let app2Url: URL = URL(string: "DashboardApp-DEV://")!
                UIApplication.shared.open(app2Url, options: [:], completionHandler: nil)
            }
            else {
                NSLog("failed to exit guided access");
            }
        }
    }
    override func didReceiveMemoryWarning( ) {
        super.didReceiveMemoryWarning( )
        // Dispose of any resources that can be recreated.
    }
}
```

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for enabling a restricted multiple-application user experience using single-application mode(s) are provided. Persons skilled in the art will appreciate that the present invention can be practiced by other than the described embodiments, which are presented for purposes of illustration rather than of limitation, and that the present invention is limited only by the claims that follow.

What is claimed is:

1. An apparatus for enabling a restricted multiple-application user experience, the apparatus comprising: a processor; a display; and one or more non-transitory computer-readable media storing a plurality of applications, each of said plurality of applications comprising computer-executable instructions and which, when executed by the processor, are in a running state and display content on the display, and wherein the plurality of applications comprise at least one unrestricted application and a plurality of single-application (SA) applications, the plurality of SA applications comprising a dashboard application and at least one peripheral application, each of the plurality of SA applications comprising an SA mode that is activated every time the SA application begins running, and wherein the active SA mode of a running SA application: prevents all applications, aside from the running SA application, from running while the SA application is running; prevents the running SA application from exiting; and remains active until the occurrence of a deactivation event, said deactivation event being one of a set of one or more predetermined deactivation events, wherein the occurrence of a predetermined deactivation event deactivates the active SA mode of the running SA application; wherein each of the plurality of SA applications is configured to define at least one transfer event, said transfer event that occurs independent of the entry of a password, said transfer event which is defined as a deactivation event, and, when a predetermined transfer event occurs during the running of an SA application: the SA mode of the running SA application deactivates; the running SA application exits from running; and a predetermined SA application is called to run, navigating a user to the called predetermined SA application, whereupon the SA mode of the called SA application is activated; wherein the dashboard application is configured to define, in addition to the at least one transfer event, an escape event that comprises the entry of a password, said escape event which is defined as a deactivation event, and, when said escape event occurs during the running of the dashboard application, the SA mode of the dashboard application deactivates, said password comprised escape event of the dashboard application being the only way for a user of the apparatus to navigate out of the restricted multiple-application user experience and run an unrestricted application; and wherein the apparatus is configured to minimize a risk of an unrestricted application running during a handoff state in a transfer, said transfer being when the transfer event of a first SA application occurs during the running of the first SA application and a user is navigated to a second SA application, and said handoff state being after the SA mode of the first SA application deactivates and before the SA mode of the second SA application activates, and wherein, to minimize the risk, the processor is configured to sequentially execute computer-executable instructions to activate the SA mode of the second SA application immediately following execution of computer-executable instructions to deactivate the SA mode of the first SA application and exit the first SA application.

2. The apparatus of claim 1, wherein the escape event of the dashboard application comprises the correct entry of a preset password in response to a password prompt, said password prompt that is displayed in response to a preset gesture, said gesture comprising the pressing, for at least a preset threshold duration, of:
  a physical button attached to the apparatus; or
  a preset location, or one of a preset plurality of locations, on the display, said display further comprising a touchscreen that can sense pressure applied to the display.

3. The apparatus of claim 1, wherein the transfer events of the SA applications comprise the pressing of:
  a physical button attached to the apparatus; or
  a button displayed on the display, said button that indicates the SA application that will be called to run by the transfer event, and said display comprising a touchscreen that can sense pressure applied to the display.

4. The apparatus of claim 1, wherein the escape event of the dashboard application, after deactivating the SA mode, exits the dashboard application and calls an unrestricted application to run, and wherein the unrestricted application called by the escape event of the dashboard application comprises a home-page with access to at least one of:
  control of administrative settings of the apparatus; and
  at least one additional unrestricted application.

5. The apparatus of claim 1, wherein the SA applications of the apparatus are configured in a hub-and-spoke architecture, said architecture comprising a single centralized hub that is connected to a plurality of surrounding spokes, and wherein the dashboard application is a hub and each of the one or more peripheral applications is a spoke, the dashboard application defining, in addition to the escape event, one or more transfer events, each transfer event navigating a user to a peripheral application, and each of the peripheral applications defining only one transfer event, said one transfer event navigating a user to the dashboard application, the configuration enabling a user to navigate between the hub and the one or more spokes, and further preventing a user from navigating directly from one spoke to another without navigating to the hub.

6. The apparatus of claim 1, wherein the SA applications of the apparatus are configured in a multi-tier hub-and-spoke architecture, a hub-and-spoke architecture comprising a single centralized hub that is connected to a plurality of surrounding spokes, and wherein the dashboard application is a hub and a plurality of peripheral applications extend from the hub as one or more chains of spokes, each chain comprising a first peripheral application as a tier-one spoke, and each chain is extendable to further comprise at least one additional peripheral application as a succession of higher numbered tiers of spokes, and wherein:
  the dashboard application defines, in addition to the escape event, one or more transfer events, each transfer event navigating a user to a tier-one peripheral application of a particular chain of spokes;
  each of said tier-one peripheral applications of each particular chain of spokes defining a first transfer event, said first transfer event navigating a user from the tier-one peripheral application to the dashboard application, and, if the particular chain comprises a tier-two peripheral application, the tier-one peripheral application of the chain further defines a second transfer event that navigates a user from the tier-one peripheral application to the tier-two peripheral application; and
  a chain of spokes extends from tier-two to the end of the chain by configuring each Nth-tier peripheral application, where N represents the numerical tier level of the peripheral application, so that a first transfer event is defined that navigates a user from tier N to tier N−1, and, if the chain comprises a tier N+1, a second transfer event is defined that navigates a user from tier N to tier N+1, the configuration enabling a user to navigate the length of each chain of spokes, and further enabling a user to navigate from the chains of spokes to the hub, the configuration further preventing a user from navigating directly from one chain of spokes to another without navigating to the hub.

7. The apparatus of claim 1, wherein the SA applications of the apparatus are configured in a meshed hub-and-spoke architecture, a hub-and-spoke architecture comprising a single centralized hub that is connected to a plurality of surrounding spokes, and wherein the dashboard application is a hub and each one of two or more peripheral applications is a spoke, the dashboard application defining, in addition to the escape event, one or more transfer events, each transfer event navigating a user to a peripheral application, and at least one peripheral application defining a transfer event that enables a user to navigate to another peripheral application, the configuration enabling a user to navigate directly from at least one spoke to at least another, the configuration further enabling a user to navigate between the hub and at least one spoke.

8. The apparatus of claim 7, wherein the architecture is configured as a fully meshed hub-and-spoke architecture, wherein each of the SA applications defines a set of transfer events that are mapped to a comprehensive set of all the other SA applications, each transfer event navigating a user to the SA application to which the transfer event is mapped, the configuration enabling a user to navigate directly from any one spoke to any other spoke, the configuration further enabling a user to navigate bilaterally between the hub and all of the spokes.

9. The apparatus of claim 1, further comprising a server located in a remote location from the display, the processor, and the media, wherein the server enforces the SA modes of the SA applications.

10. The apparatus of claim 1, further comprising a secure-handoff element, said secure-handoff element that prevents an unrestricted application from running during a handoff state in a transfer, said transfer being when the transfer event of a first SA application occurs during the running of the first SA application and a user is navigated to a second SA application, said handoff state that is after the SA mode of the first SA application deactivates and before the SA mode of the second SA application activates, the secure-handoff element comprising a transfer indicator, and a transfer register, and wherein, when a transfer event defined in a first SA application occurs during the running of the first SA application, said transfer event that enables a transfer to a second SA application:
  the first SA application communicates to the secure-handoff element:
    that a transfer is impending, whereupon the transfer indicator, which is by default set to an off setting, is toggled to an on setting; and
    the identity of the second SA application, whereupon the transfer register is set to store information identifying the second SA application;
  the secure-handoff element prevents all applications, except for the application identified in the transfer register, from running while the transfer indicator is toggled to an on setting; and
  upon the activation of the SA mode of the second SA application, the transfer indicator is toggled to an off position.

11. One or more non-transitory computer-readable media storing computer-executable instructions which, when executed by a processor in a computerized device, perform a method for enabling single-application (SA) modes to provide a restricted multiple-application user experience, the method comprising: configuring, each of a plurality of restricted single-application (SA) applications stored in the media, with an SA mode, said SA mode: activating every time an SA application begins running on the processor; preventing all applications, aside from the running SA application, from running while the SA application is running; preventing the running SA application from exiting; and remaining active until the occurrence of a deactivation event, said deactivation event being one of a set of predetermined deactivation events, wherein the occurrence of a predetermined deactivation event deactivates the active SA mode of the running SA application; linking, at least a first SA application to a second SA application, in a manner that allows a user of the device to navigate from the first SA application to the second SA application without the entry of a password, the link enabling a multiple-application user experience while adhering to the restrictions of the SA modes of each SA application, said linking via the defining, in the first SA application, of a transfer event that is independent of the entry of a password, further defining said transfer event as a deactivation event, and, when said transfer event occurs during the running of said first SA application: deactivating the SA mode of the first SA application; exiting the first SA application from running; and navigating a user to the second SA application by calling the second SA application to run, whereupon the SA mode of the called SA application is activated; configuring one of the plurality of SA applications as a dashboard application, and the remaining SA applications as peripheral applications; defining, in the dashboard application, in addition to at least one transfer event, an escape event that involves the entry of a password, further defining said escape event as a deactivation event, and, when said escape event occurs during the running of the dashboard application, deactivating the SA mode of the dashboard application, said deactivation of the SA mode terminating the restricted experience and enabling a user to exit the dashboard application and call an unrestricted application to run, said unrestricted application being an application unrestricted by an SA mode; and minimizing a risk of an unrestricted application running during a handoff state in a transfer, said transfer being when the transfer event of a first SA application occurs during the running of the first SA application and a user is navigated to a second SA application, and said handoff state being after the SA mode of the first SA application deactivates and before the SA mode of the second SA application activates, wherein said minimizing the risk comprises configuring the processor to sequentially execute computer-executable instructions to activate the SA mode of the second SA application immediately following execution of computer-executable instructions to deactivate the SA mode of the first SA application and exit the first SA application.

12. The method of claim 11, further comprising, as the escape event of the dashboard application, the correct entering of a preset password in response to a password prompt, said password prompt that is displayed in response to a preset gesture, said gesture comprising the pressing, for at least a preset threshold duration, of:
  a physical button attached to the device; or
  a preset location, or one of a preset plurality of locations, on a display that is attached to the device, said display further comprising a touchscreen that can sense pressure applied to the display.

13. The method of claim 11, wherein the transfer events of the SA applications comprise the pressing of:
  a physical button attached to the device; or
  a button displayed on a display that is attached to the device, said button that indicates the SA application that will be called to run by the transfer event, said display further comprising a touchscreen that can sense pressure applied to the display.

14. The method of claim 11, wherein at least one unrestricted application comprises a home-page, said home-page having access to at least one of:
  control of administrative settings of the device; and
  at least one additional unrestricted application.

15. The method of claim 11, further comprising configuring the SA applications in a hub-and-spoke architecture, a hub-and-spoke architecture comprising a single centralized hub that is connected to a plurality of surrounding spokes, the dashboard application being a hub and each of the one or more peripheral applications being a spoke, the dashboard application defining, in addition to the escape event, one or more transfer events, each transfer event navigating a user to a peripheral application, and each of the peripheral applications defining only one transfer event, said one transfer event navigating a user to the dashboard application, the configuration enabling a user to navigate between the hub and the one or more spokes, and further preventing a user from navigating directly from one spoke to another without navigating to the hub.

16. The method of claim 11, further comprising configuring the SA applications in a multi-tier hub-and-spoke architecture, a hub-and-spoke architecture comprising a single centralized hub that is connected to a plurality of surrounding spokes, the dashboard application being a hub and a plurality of peripheral applications extending from the hub being one or more chains of spokes, each chain comprising a first peripheral application as a tier-one spoke, and each chain is extendable to further comprise at least one additional peripheral application as a succession of higher numbered tiers of spokes, the method further comprising:

defining, in the dashboard application, one or more transfer events in addition to the escape event, each transfer event navigating a user to a tier-one peripheral application of a particular chain of spokes;

defining, in each of said tier-one peripheral applications of each particular chain of spokes, a first transfer event, said first transfer event navigating a user from the tier-one peripheral application to the dashboard application, and, if the particular chain comprises a tier-two peripheral application, further defining in the tier-one peripheral application of the chain a second transfer event, said second transfer event that navigates a user from the tier-one peripheral application to the tier-two peripheral application; and extending, if a chain of spokes comprises more than two tiers of spokes, from tier-two to the end of the chain by configuring each Nth-tier peripheral application, where N represents the numerical tier level of the peripheral application, so that a first transfer event is defined that navigates a user from tier N to tier N−1, and, if the chain comprises a tier N+1, a second transfer event is defined that navigates a user from tier N to tier N+1, the configuration enabling a user to navigate the length of each chain of spokes, and a user is further able to navigate from the chains of spokes to the hub, the configuration further preventing a user from navigating directly from one chain of spokes to another without navigating to the hub.

17. The method of claim 11, further comprising configuring the SA applications of the device in a meshed hub-and-spoke architecture, a hub-and-spoke architecture comprising a single centralized hub that is connected to a plurality of surrounding spokes, the dashboard application being a hub and each one of two or more peripheral applications being a spoke, the dashboard application defining, in addition to the escape event, one or more transfer events, each transfer event navigating a user to a peripheral application, and at least one peripheral application defining a transfer event that enables a user to navigate to another peripheral application, the configuration enabling a user to navigate directly from at least one spoke to at least another, the configuration further enabling a user to navigate between the hub and at least one spoke.

18. The method of claim 17, further configuring the architecture as a fully meshed hub-and-spoke architecture, defining, in each of the SA applications, a set of transfer events that are mapped to a comprehensive set of all the other SA applications, each transfer event navigating a user to the SA application to which the transfer event is mapped, the configuration enabling a user to navigate directly from any one spoke to any other spoke, the configuration further enabling a user to navigate bilaterally between the hub and all of the spokes.

19. The method of claim 11, further comprising enforcing the SA modes of the SA applications via a server located in a remote location from the device.

20. One or more non-transitory computer-readable media storing computer-executable instructions which, when executed by a processor on a computer system, perform a method for enabling a single-application (SA) mode to provide a restricted multiple-application user experience, the method comprising: configuring one of a plurality of applications stored on the media as a dashboard application, and a plurality of the remaining applications stored on the media as nested applications; configuring the dashboard application with a nested SA mode, said nested SA mode: activating every time the dashboard application begins running on the processor; preventing all applications, aside from the dashboard application, from running independently while the dashboard application is running; allowing only the predetermined nested applications to run within the dashboard application; preventing the dashboard application from exiting; and remaining active until an occurrence of an escape event, the escape event involving an entry of a password, said escape event predetermined by the dashboard application, the occurrence of the predetermined escape event of the dashboard application during the running of the dashboard application, deactivating the nested SA mode of the dashboard application, said deactivation of the nested SA mode terminating the restricted experience and enabling a user to exit the dashboard application and call an unrestricted application to run, said unrestricted application being an application unrestricted by a nested SA mode, wherein the entry of the password is in response to a password prompt, said password prompt that is displayed in response to a predetermined gesture, and said gesture includes: pressing a physical button or a predetermined location on a touchscreen for a predetermined duration of time; or receiving a predetermined voice command via a microphone.

* * * * *